F. C. NEWELL, Jr.
MUTABLE PUBLICITY APPARATUS.
APPLICATION FILED AUG. 28, 1911.
1,069,895.
Patented Aug. 12, 1913.
5 SHEETS—SHEET 1.
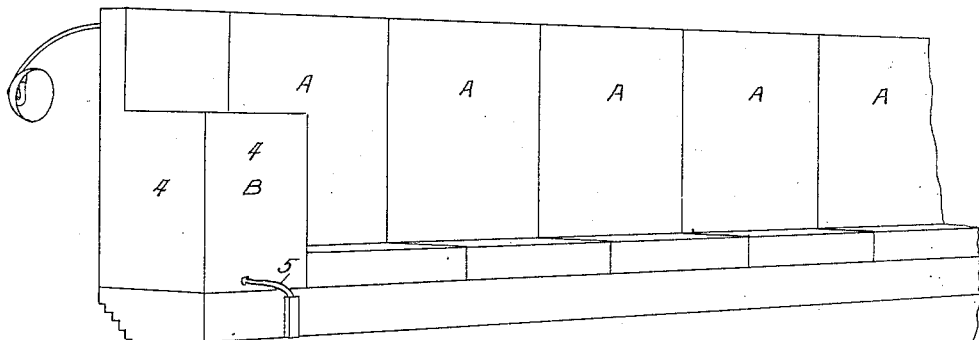
Fig. 1
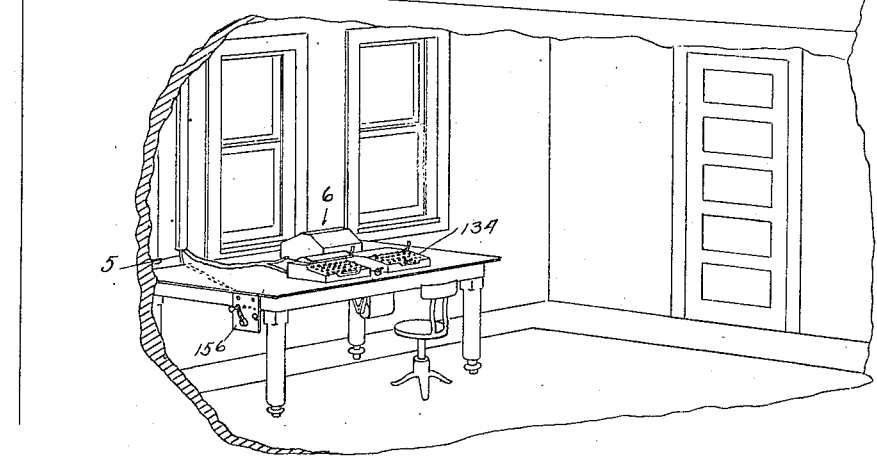
Fig. 2
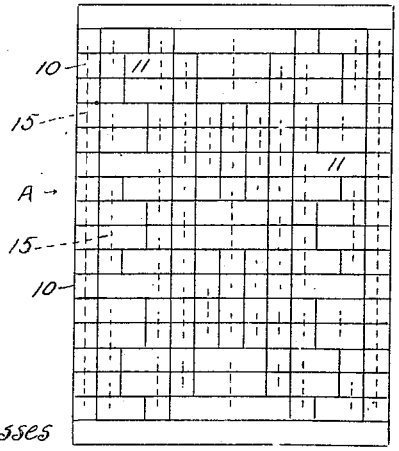
Fig. 3
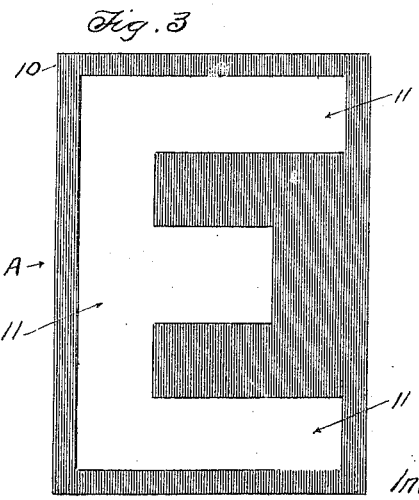
Witnesses
Harry A. Brooks
S. C. Sault
Inventor
F. Clarence Newell Jr.
By Alex N. Liddee
his Attorney

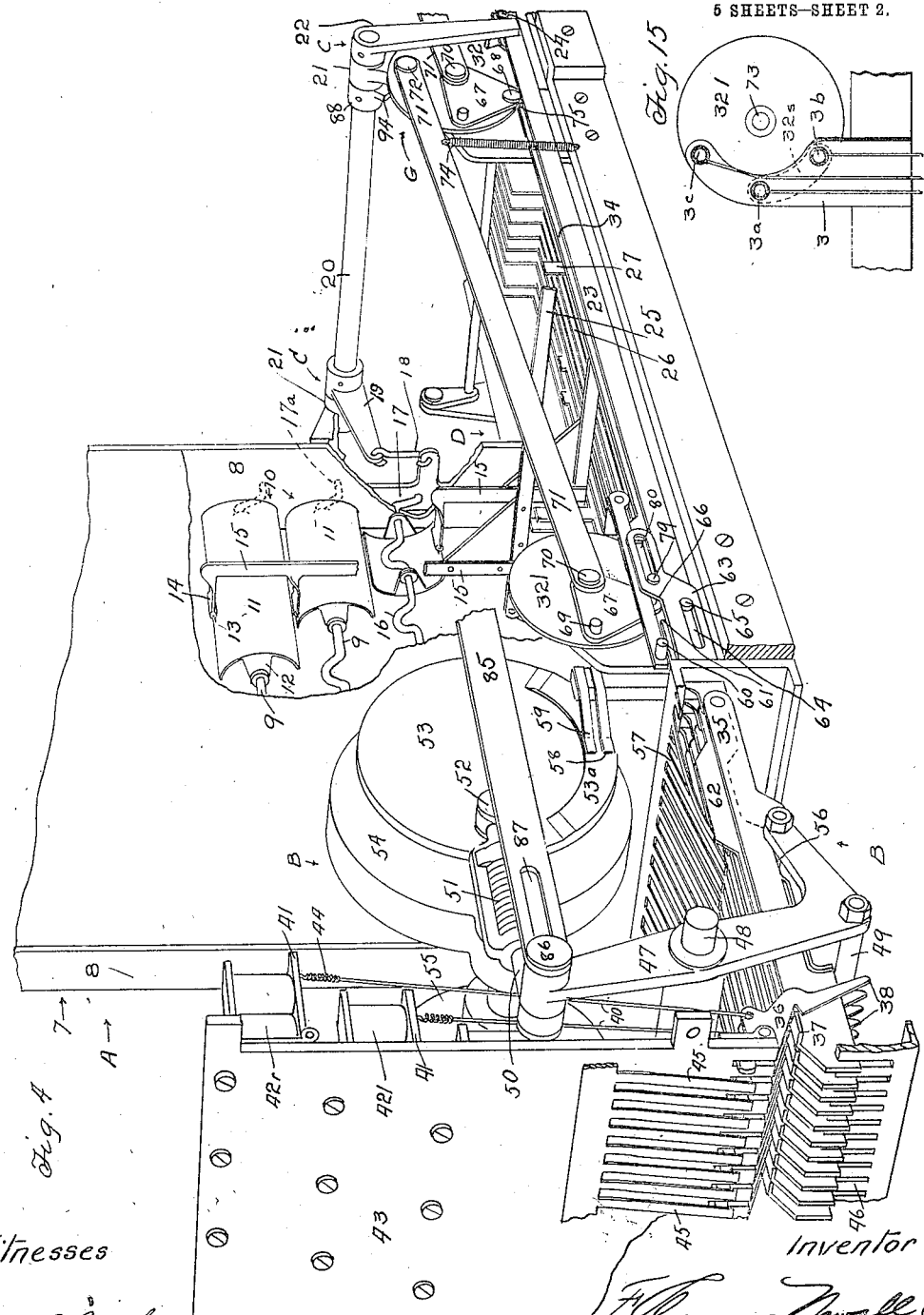

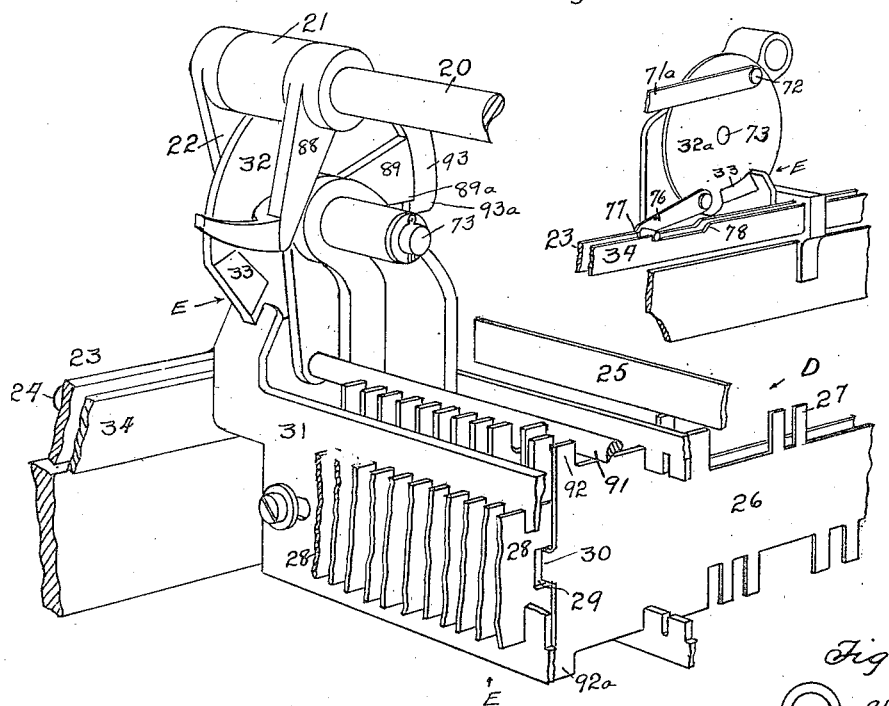
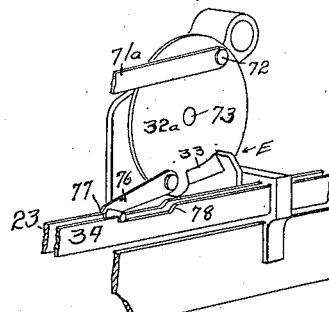
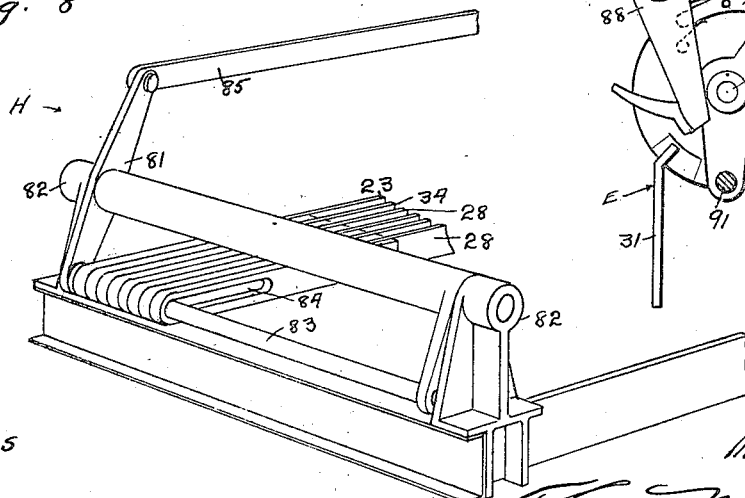
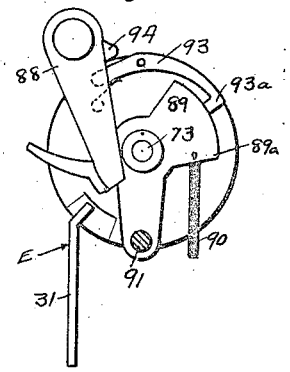

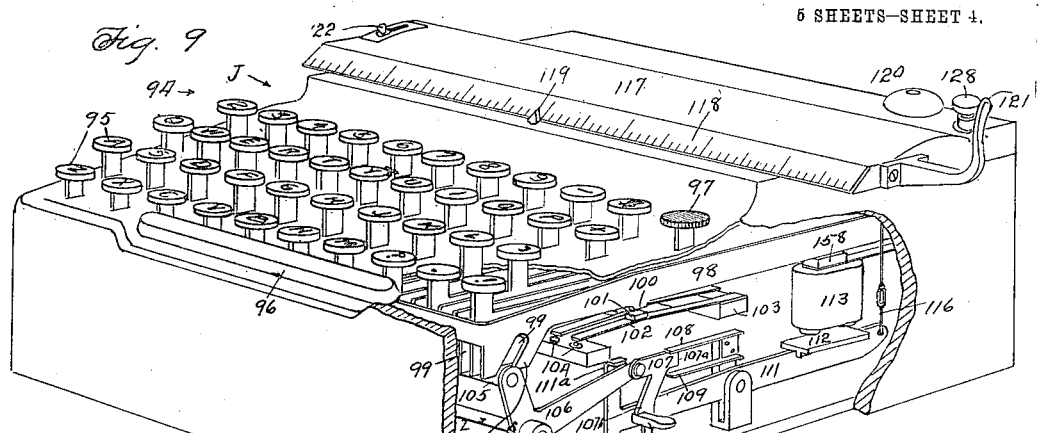

F. C. NEWELL, Jr.
MUTABLE PUBLICITY APPARATUS.
APPLICATION FILED AUG. 28, 1911.
1,069,895.
Patented Aug. 12, 1913.
5 SHEETS—SHEET 5.
Fig. 12
Fig. 14
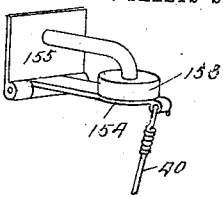
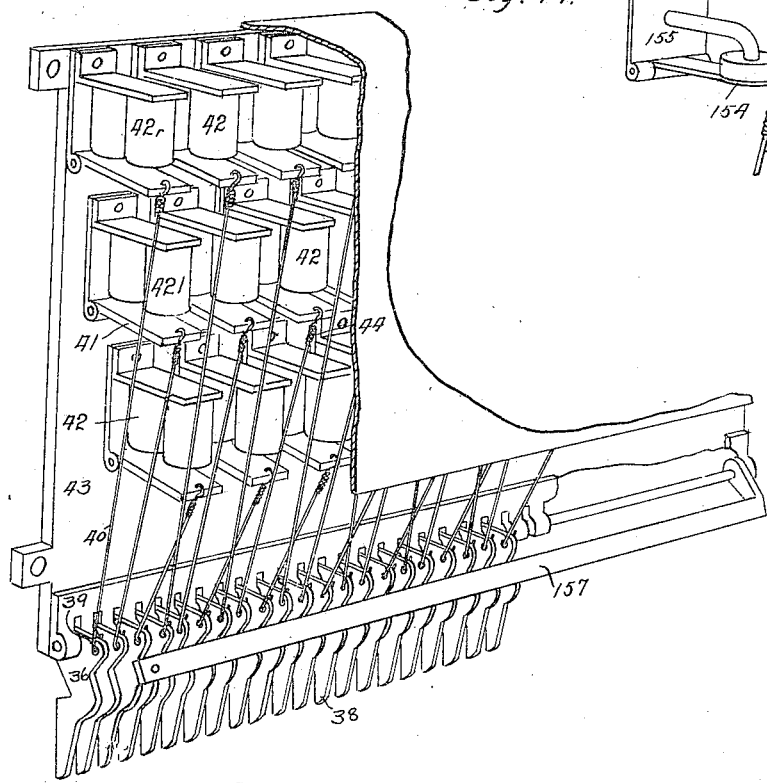
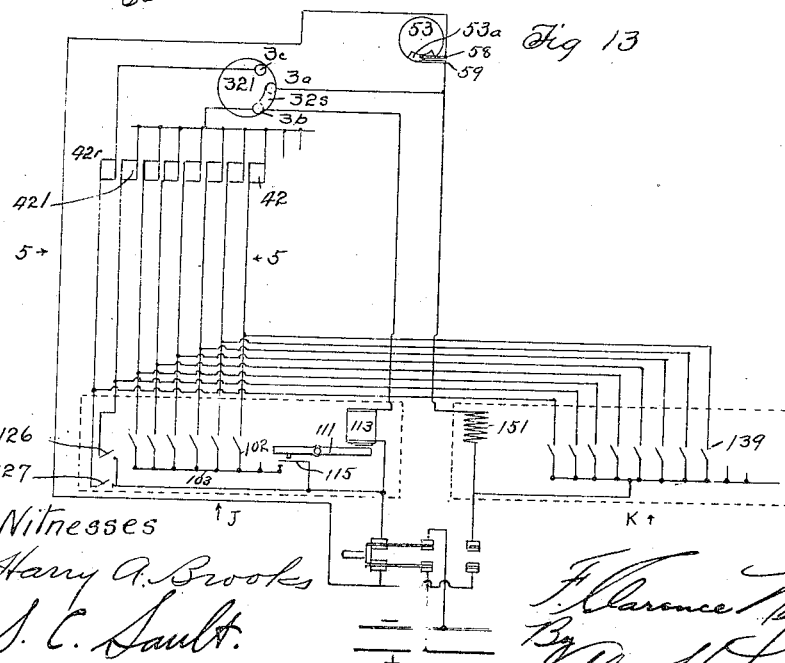
Fig. 13
Witnesses
Harry A. Brooks
S. C. Sault
Inventor
F. Clarence Newell, Jr.
By
Rex H. Ludders
His Attorney

UNITED STATES PATENT OFFICE.

FRANK CLARENCE NEWELL, JR., OF LOS ANGELES, CALIFORNIA.

MUTABLE PUBLICITY APPARATUS.

1,069,895.

Specification of Letters Patent.   Patented Aug. 12, 1913.

Application filed August 28, 1911.   Serial No. 846,560.

*To all whom it may concern:*

Be it known that I, FRANK CLARENCE NEWELL, Jr., a citizen of the United States of America, residing at Los Angeles, in the county of Los Angeles, State of California, have invented a certain new and useful Mutable Publicity Apparatus; and I do hereby declare the following to be a full, clear, and exact description of the invention, such as will enable others skilled in the art to which it appertains to make and use the same.

This invention relates to mutable publicity apparatus, particularly such an apparatus in which a series of letters, figures or other characters may be produced to form a legend or design, and the same may, at the will of the operator, be withdrawn from view or changed.

It is an object of the invention to provide novel and improved apparatus of the class specified in which a series of stationary character units may be actuated by operating mechanism common to all of the said units.

It is also an object of the invention to provide an apparatus that may be operated through the instrumentality of a key-board closely resembling that of the ordinary typewriter.

It is also an object to provide the apparatus with automatic means whereby the legend may be produced and displayed by means of a perforated strip of paper or similar material.

Another object is to provide means by which the characters composing a legend may be successively transmitted to the various character units, and said units operated simultaneously to display said legend.

A further object is to provide means whereby damage to the apparatus or the obliteration of the legend before it has been displayed, owing to careless operation, may be prevented.

A further object is to prevent unintentional repetition of characters by the accidental holding down of a key.

A further object is to use electro-magnets for holding parts in position after said parts have been brought into position mechanically, thereby obviating the use of large magnets with the consequent necessity for large current consumption.

Further objects of the invention are, to provide an apparatus which is simple in construction, economical to manufacture and operate, easy to manipulate, and durable and effective in use.

With the above and other objects in view, the invention may be embodied in the hereinafter described construction, reference being had to the accompanying drawings, in which—

Figure 1 is a general view in perspective of the apparatus in position upon and in a building; Fig. 2 is a diagram, showing the position and arrangement of the display members in one of the character units; Fig. 3 is an illustration of a letter formed by the apparatus; Fig. 4 is a perspective view, with portions broken away, of the operating mechanism; Fig. 5 is a similar view, showing the tripping mechanism; Fig. 6 is an elevation of a portion of the same; Fig. 7 is a perspective detail of the initial end of the progressor means; Fig. 8 is a perspective view of the tracker returning means; Fig. 9 is a perspective view, with portions broken away, of the key-board. Fig. 10 is a perspective detail of the re-setting contact devices; Fig. 11 is a perspective view of the automatic operating device; Fig. 12 is a perspective view of the electromagnets and operative connections; Fig. 13 is a diagram of the electric circuits; Fig. 14 is a perspective detail of a pneumatic substitute for the electromagnets, and Fig. 15 is a detail of an automatic switch.

*Note.*—Throughout the following description, except when referring to the key-board, the right hand end of the apparatus is that toward the right hand of a spectator standing in front of and facing the apparatus in a position to read any legend displayed thereby.

Referring now more particularly to Fig. 1, the character units A may be placed side by side in any convenient position, and may have at one end, operating mechanism B preferably provided with a case 4. To this operating mechanism may be connected wires 5 leading to the transmitter devices 6, preferably located within the building.

Referring now to Figs. 2, 3, and 4, the character units A may comprise the frame 7, provided with side pieces 8 in which are pivotally mounted rods 9. Side by side upon the rods 9 are loosely mounted a plurality of display members 10 each consisting in this instance of the curved piece 11 and integrally formed end pieces 12 which latter are journaled upon the said rods 9. One edge of each of the curved pieces 11, which are of contrasting colors on their two sides, is provided with a slot 13 through which passes the end of arm 14 of the connector 15, said end being curved to form a hinge in connection with the metal at the edge of said piece 11. The display members may be of various lengths and two or more may be coupled to the same connector, as is indicated by the dotted vertical lines in Fig. 2.

In order to move the display members 10 to have them all in like position, resetting means C is preferably employed and consists of the following: Rods 9 may be provided with projections 16, disposed adjacent to and adapted to contact with the curved piece 11 of each of members 10, whereby rotation of the rods 9 will turn all the members thereon by reason of the projections 16 engaging with the curved pieces 11. To effect the turning of these rods, there is provided a side plate 17 which engages cranks 17ª upon the ends of rods 9. Side plates 17 are connected by means of a link 18 to an arm rigidly attached to a shaft 20 pivotally mounted in bearings 21 and having a second arm 22 adapted to be actuated by lifter-tracker 23 which carries a stud 24 arranged to contact with and move said arm 22. Upon the operation of tracker 23, the means for which will be described later, the display members 10 will all be turned to have their concave sides on display, and when the said tracker is released the said members will all be turned to have their convex sides on display, and it will be evident that if a predetermined number of single or of connected groups of the said display members in any of the character units A are held from rotation by means of the connectors 15, a desired character may be formed upon the said character unit. The selective mechanism D by which the holding of the said connectors 15 in an upward position is accomplished may be as follows: To each of the said connectors 15 is rigidly attached a tumbler 25, (see Figs. 4 and 5) and beneath the tumbler 25 are disposed a series of combs 26 provided with teeth 27 which teeth normally are in such a position that the tumblers may descend freely, but when the combs are moved to a certain position the teeth come into place beneath one or more of said tumblers. The combs 26 may be moved by means of trackers 28, each of which is provided with an opening 29 by which it may engage the projection 30 on the adjacent comb 26 when the trackers are moved laterally (in the present instance). This lateral movement may be accomplished by means of engaging mechanism E comprising tracker guides 31. Each of guides 31 may be successively moved to bring the combs of its particular character unit into engagement with the trackers 28 by means of a disk 32 which has a cam portion 33 formed near the periphery thereof. The cam disks 32 are serially or progressively operated by means of spacer tracker 34. Each of the trackers 23, 28 and 34 are connected preferably at the right hand (or end of the line) end of the apparatus to the operating mechanism B which may be as follows: A hook 35 is normally held in an upward or inoperative position by a latch 36 engaging a lug 37 upon the hook 35. Latch 36 is also provided with a tail 38 and with an ear 39 through which latter passes a wire 40 connecting it to the hinged armature 41 of an electromagnet 42 mounted upon the panel 43. Each of the latches 36 is provided with a spring 45 the action of which tends to draw the armature 41 away from electromagnet 42. Each wire 40 is preferably provided with a spring portion 44. The hooks 35 are attached at their inner ends to their respective trackers and may be provided at their outer end with guides 46. A rocker 47 pivotally mounted upon a shaft 48 carries a bar 49 which oscillates below the hooks 35; the oscillation being effected by a rod 50, preferably with a resilient element 51, connecting the rocker to a wrist pin 52 upon a crank disk 53 which latter may be rotated by means of gearing which is contained in case 54 and operated by means of an electric or other motor 55. Rocker 47 also carries a second bar 56, which, when the parts are in the position shown in Fig. 4, engages the under side of the hooks and raises the latter until the lugs 37 contacting with latches 36 move the latter against the tension of the springs 45, and, through the medium of the parts described, force the armatures 41 into contact with their respective electromagnets 42. If an electric current is sent through any of the electromagnets 42 (in a manner to be explained later) when the rocker 47 starts forward, the latch connected with the armature of that particular electromagnet will not be permitted to engage the lug 37 of its hook 35 and said hook will be pressed downwardly by its spring 57 and it will contact with the bar 49 and thus draw to the right the tracker to which it is attached. A commutator segment 53ª is affixed to the disk 53, and by means of brushes 58 and 59, interrupts the circuit of the electromagnets 42 shortly after a hook 35 has been engaged by the bar 49. This causes the armature 41 to drop and restores the latch 36 to position for a succeeding operation. At the same time the bar 49 contacts with the tails 38 of the latches to insure that the armatures do not remain in place owing to residual magnetism.

The lifter tracker 23 may be operated in either of two ways, depending upon whether the characters are to be displayed serially or in a whole line simultaneously. In the second instance the second electromagnet 42¹ would be energized and actuate the parts to move the lifter tracker 23 to the right until pivoted stop 60 affixed to any stationary part of the apparatus drops behind a projection 61 formed on said tracker to hold it in its moved position. The hook 35 which is directly connected to the tracker 23 is provided with an off-set portion 62 which permits of the play of bar 56 without interfering with the hook when the tracker is held in its right hand position. If the character units are to be displayed serially, the tracker 23 is operated by means of the first electromagnet 42ʳ, hook, etc., which pulls a short tracker 63 which is adapted to engage with a stud 65 affixed to the tracker 23 and arranged in a slot 64 in the tracker 63. The short tracker 63 is provided with an inclined portion 66 which is adapted to raise the stop 60 out of engagement with the projection 61 so that upon the return stroke of the rocker 47 the tracker 23 may be moved to resume its left hand position.

The progressor means G by which the different tracker guides 31 are successively moved to bring the trackers of a particular unit into engagement with the combs of that unit may be as follows:—Each of the disks 32 except the first, 32ª, is preferably provided with a piece 67 (triangular shaped in the present instance) mounted at one corner thereof upon a pivot 68 near the periphery of the disk and provided at its two remaining corners with a pin 69 and a second pivot 70 to which latter is connected one end of a link 71; the other end of the link 71 being pivotally attached to a stud 72 which is mounted near the periphery of the preceding disk 32 and is preferably disposed at a greater distance than the pivot 70 from the center of the shaft 73, Fig. 5, upon which said disk rotates. A spring 74 may be attached to the link 71 at its one end and to a fixed portion of the apparatus at its other end. Spacer trackers 34 may be provided with projections 75 which are adapted to contact with pins 69 when any of the latter is moved into a certain position. The initial disk 32ª, Fig. 7, is not provided with a piece 67 but has instead thereof a pawl 76 which lies in the path of both a projection 77 on the tracker 23 and of a projection 78 on the tracker 34. Upon a complete stroke of the tracker 23 disk 32ª will be rotated through an angle of approximately 60 degrees and it will move the tracker guide 31 to bring the trackers into engagement with the combs 26 of the initial character unit. If, now, any one of the electromagnets 42 (other than those pertaining to trackers 23 and 24) is energized, its particular tracker will move its comb 26 to the right to bring its teeth 27 below the tumbler or tumblers pertaining to the particular character corresponding to that tracker. The rotation of disk 32ª also, by means of link 71ª, moves the piece 67 of the second character unit on its pivot 68 until the pin 69 rests upon the tracker 34 and upon the movement to the right of the said tracker 34 the pin 69 is thrown, by the action of the spring 74, down into the path of projection 75. Upon the return stroke of the tracker 34, the projection 75 by contacting with the pin 69 rotates the second disk 32, and, at the same time, the link 71ª is moved to restore disk 32ª to its initial position and the link 72 moves the piece 67 of the succeeding or third disk 32 into position to be engaged by the tracker 34. In Fig. 7 the tracker 23 is shown in its right hand position and it will be seen that when it is operated and returned to its left hand position, as has been previously described, the subsequent operation of tracker 34 will lift the pawl 76 out of engagement with the projection 77 and allow the link 71ª to restore the disk to its normal position. The disks 32 are one more in number than the character units, the last disk 32¹ of the series not being operatively connected with any tracker guide, but acting as a switch for the electric circuits and also serving for the purpose of restoring the preceding disk to its normal position, it oscillates in proximity to a standard 3 (see Fig. 15) upon which are mounted insulatedly contact pieces 3ª, 3ᵇ and 3ᶜ. A sliding shoe 32ˢ, insulatedly attached to the disk 32¹, brings either contact piece 3ᵇ or 3ᶜ into electrical connection with contact piece 3ª, closing or opening the circuits as shown in Fig. 13. The disk 32¹ is restored to position by a pin 79 adapted to be engaged by the end of the slot 80 in the short tracker 63.

At the initial end of the machine is positioned the tracker returning device H shown in Fig. 8, which may consist of a rocker 81 pivotally mounted in bearings 82 attached to the frame of the apparatus and having a cross bar 83 which is arranged in slots 84 formed in reinforced ends of the trackers 28, 23 and 34. A return tracker 85 is attached at its one end to the upper end of the rocker 81 and at its other end it is attached to the upper end of rocker 47 by means of a stud 86 passing through a slot 87 in the tracker. Whenever one or more of the trackers 28, 23 or 34 are operated, they draw the bar 83 to the right and also the tracker 85 to the left and on the completion of the stroke of rocker 47 it draws the tracker 85 to the right and thereby returns any of the trackers 28, 23 or 34 to its normal position.

The shaft 20 may be held from rotation and the side piece 17 held in its upper position prior to the display of a character by the trip means shown more particularly in Fig. 6.

Referring to Figs. 4, 5 and 6, upon each of the shafts 20 is rigidly affixed an arm 88 the lower end of which engages a trip member 89 which is co-axially mounted with the disk 32 and normally held into engagement with said arm 88 by means of spring 90, Fig. 6. Trip member 89 carries a cross bar 91 which is adapted to engage a projection 92 or 92ᵃ on the combs 26 depending upon which side of the combs is uppermost; the combs being reversible for a purpose hereinafter explained. Mounted at the periphery of the disk 32 is a latch 93 which may engage the trip member 89, and a projection 94 formed on arm 88 is adapted to engage the end 95 of the latch 93 when the arm 88 or the shaft 20 rotates to allow the sidepiece 17 to descend.

The electromagnets 42 may be energized by means of an electric current derived from any suitable source, the circuit being preferably closed by means of manual transmitting apparatus J or automatic transmitting apparatus K shown in Figs 9, 10 and 11. The transmitting apparatus J may consist of manual key board 94 shown in Fig. 9 which may be provided with keys 95 preferably arranged nearly like that of a standard typewriter and provided with a space bar 96 and also with a silent extra key 97 not operatively connected to any part of the apparatus but merely used by the operator for getting into step with the oscillations of the rocker 47. To each of the keys 95 and also to space bar 96 is connected a lever 98 which is pivoted at one end and provided near its other end with a sloping recess 99 and also with a projection 100 which when the key or space bar is depressed presses down an insulating block 101 carried by a contact spring 102 which is affixed at one end to a conductor piece 103 and is adapted to engage at its other end with a contact 104 which is in electrical communication with that one of the magnets 42 pertaining to the tracker 28 belonging to the particular key.

The means L to prevent unintentional repeating of characters may be described as follows:—Below the recess 99 of the levers 98 is positioned a bar 105 attached to a bell crank 106 having its rear end pivotally connected to a piece 107, with a projecting portion 107ᵃ which plays between springs 108 and 109 attached to some stationary part of the apparatus. The lower end of piece 107 is formed with a shoulder 107ᵇ which, in the upper position, engages a part 110 attached to a lever 111 pivotally mounted on the base of the apparatus. The lever 111 carries on its rear end an armature 112 which when the front end of the lever is depressed by piece 107, comes in contact with pole piece of a magnet 113 arranged in an electric circuit which by means of the commutator 53ᵃ is interrupted at every oscillation of the rocker 47. The front end of lever 111 carries a part 111ᵃ that rests upon the rear arm of the bell crank 106 and holds the said arm down until the armature 112 is released from the magnet 113. A projection on the front end of lever 111 contacts with an insulating block 114 on a spring 115 which is in the same circuit as the piece 103 and closes the said circuit when the said lever is depressed. The rear end of lever 111 is connected by means of a link 116 with release mechanism of any preferred construction (which is not here illustrated or described as it forms no part of this present invention) by which the carriage 117 is allowed to move toward the left to bring the graduations of scale 118 carried thereby successively into alinement with the pointer 119 affixed to the top of the key board. Bell 120 may be operated in the usual manner by the said carriage 117 when it nears the limit of its movement to the left. The carriage 117 may also be provided with a finger piece 121 whereby it may be moved to the right; this operation being adapted, by means of contact devices shown in Fig. 10, to clear the character units by actuating the resetting means C by energizing either of the magnets 42ˡ or 42ʳ pertaining to tracker 23 or 63. Carriage 117 carries at its left hand end a lever 122 which is pivotally mounted thereon and may be moved so that its lower end 123 on the movement of the carriage to the right may contact with either of insulating blocks 124 or 125 which are carried by contact springs 126 and 127 respectively. Contact with the block 124 closes the circuit of the magnet 42ʳ associated with tracker 63, which, as has already been stated, thereupon moves forward, or to the right, with tracker 23 and immediately returns it to its initial position. Contact with block 125 energizes the second magnet 42ˡ, which will cause tracker 23 to be pulled forward (to the right) and held there by the stop 60. A button 128 upwardly pressed by spring 129 may be connected by means of a bent rod 130 to block 124, whereby contact may be made to energize the magnet 42ʳ connected with tracker 63.

If desired, the apparatus may be automatically operated by means of the transmitting apparatus K employing a strip 131 of paper or similar material having therein perforations 132 and 133 which may be formed by means of a perforating apparatus of any approved construction and which is indicated by the reference numeral 134 in Fig. 1. The perforations 132, as the strip 131 passes over rollers 135 and 136, pass under a projecting end 137 of bell-cranks 138; the other end of the bell crank 138 being adapted to press against contacts 139 each of which is electrically connected to one of the magnets 42, 42ʳ or 42ⁱ. Current may be supplied to these bell-cranks 138 through the comb 140 the spring teeth of which comb rest under the projections 141 on the bell-cranks and press the ends 137 thereof downwardly through the holes 132 as the said holes pass under the said ends. Roller 136 is preferably provided with grooves or depressions 142 which register with the holes 132 so that as the roller rotates the ends 137 of the bell-cranks are lifted by the sides of said groove and thus prevent wear of the strip 131 at the edges of the holes 132. The roller 136 is preferably driven by means of gearing 143 operated by a spring (not seen) in a spring barrel 144.

The shaft 145 of roller 136 carries an escapement wheel 146 adapted to be intermittently released by a detent 147 which may be of any approved construction and which may be mounted upon a shaft 148 and have rigidly connected thereto a lever 149 the movable end of which carries an armature 150 adapted to be drawn upwardly or released by a solenoid or magnet 151. The rollers 135 and 136 are preferably provided with sprocket teeth 152 adapted to enter the holes 133 at each side of the strip 131 to move it and keep the perforations 132 in alinement beneath the ends 137 of the bell-cranks.

The pneumatic substitute for the electro-magnets, as illustrated in Fig. 14, may consist of a chamber 153 from which the air is exhausted when it is, by means of any preferred form of valve key, put into communication with a receptacle in which a vacuum is maintained. The valve 154 is hingedly connected to the plate 155 supporting the chamber 153 and it is connected by means of a wire 40 to one of the latches 36 as in the principal construction.

In the operation of the invention, the motor 55 being started by means of the rheostat 156, shown in Fig. 1, and, assuming that it is desired to exhibit each character unit in succession; the lever 122 being in the position shown in Fig. 9 and the carriage 117 being thrown to the right, contact is made by the end 123 of lever 122 with the block 125 and by the means already described the first magnet 42ʳ pertaining to tracker 63 is energized and said tracker is pulled to the right and draws with it, by means of stud 65, the tracker 23. This raises all of the side plates 17, thereby turning all of the display members 10 to have the concave side thereof on display. Any of the various keys on the key-board 94 may now be operated in succession to write any desired legend. The depression of any key throws the bar 105 to the rear (away from the operator) thus bringing said bar underneath the part 99ᵃ of the lever 100 and preventing the depression of a second key until the first key has been released. The depression of the forward end of bell-crank 106 carries with it the piece 107 which presses down upon the part 110 and thereby the armature 112 attached to lever 111 is raised almost into contact with magnet 113. Upon the commutator segment 53ᵃ being in a position for passing current to the magnet 113, through the circuit shown in Fig. 13, the armature 112 will be attracted and held against the pole pieces of said magnet, thereby relieving the piece 107 of pressure and allowing it to be swung clear of the part 110 by the spring 109. At the same time electrical contacts have been established as has already been explained. When the commutator segment 53ᵃ breaks the circuit through magnet 113, the armature 112 drops and the forward end of lever 111 rises, thus allowing the spring 115 to break the circuit even should the key be retained in a downward position. Upon releasing the key the bell-crank 106 may be returned to its initial position by means of a spring 106ᵃ, whereupon the operation may be repeated. The part 111ᵃ of the lever 111 acts to prevent the bell-crank returning to its initial position before the armature 112 is released from the magnet 113. Upon the top of the magnet 113 is preferably arranged a sounder 158 which at every revolution of the disk 53 is drawn down and adapted to emit a sound to guide the operator in the depression of the keys to prevent release of a key until the segment 53ᵃ bridges the contacts for energizing the magnet 113. The electric impulse sent to each of the electromagnets upon the depression of its key causes its particular tracker to be moved as has already been explained. By referring to Fig. 12 it will be seen that back of all the latches 36, except the first two, extends a bar 157 which is connected to the third latch, the one pertaining to spacer tracker 34, whereby when any one of the keys is depressed the hook 35 pertaining to spacer tracker 34 is dropped and that tracker operates simultaneously with any of the trackers 28 without the necessity of energizing the magnet pertaining to said tracker 34. It has already been explained how tracker 23 moves the initial disk 32ᵃ into a position to throw its comb guide 31 into position to cause the trackers 28 to be in a position to engage the combs 26 of that character unit. The various disks 32 are moved in succession by the tracker 34, as has already been explained, to bring the trackers 28 into engagement with the combs 26 of the various character units. The projections 92 on any comb 26 contacting with the bar 91 causes the trip member 89 to rotate upon the shaft 73 and thus tensions the spring 90. The first movement of the disk 32 carries the latch 93 until its end 93ª engages the corner 89ª of the trip member 89 and the second movement of disk 32 will therefore rotate the trip 89 drawing it out of engagement with arm 88, allowing the shaft 20 to rotate and allowing such of the tumblers 25 to descend as are not held up by the teeth 27 of the combs 26, and thereby turning outwardly the convex sides of the display members 10, attached thereto forming a character or design on the character unit A. It is to be understood that if the trip member 89 has not been moved by any one of the projections 92 that the corner 89ª will be beyond the limit of travel of the end 93ª of the latch 93, and the trip means I will not be operated but the progressor mechanism G will pass along to the next character unit A. When the last one, 32 1, of the series of disks (shown near the central part of Fig. 4) has been operated to bring the stud 79 to the opposite end of the slot 80 to that shown in Fig. 4 the circuit of magnets 42 and 113 is broken by said disk (see Fig. 13). This prevents further operation of the trackers 28 and causes cessation of the operation of the sounder, thus indicating to the operator that the end of the line has been reached. The carriage 117 may then be returned toward the operator's right and the operation repeated. Energization of magnet 42ʳ causes disk 32 1 to be rotated and breaks the circuit of said magnet and thus prevents a repetition of the operations.

When it is desired to write a legend without displaying it as each character is written, the lever 122 may be placed in the position shown in Fig. 10 and upon drawing the carriage 117 to the operator's right the second magnet 42 1, that which is directly connected to lifter tracker 23, is energized. This pulls the said tracker to the right and the stop 60 holds it in that position and consequently a second accidental energization of said magnet would not do any harm. The trackers, combs, etc., may now be operated as previously, and when the sounder 158 ceases operation, and at the time that the carriage 117 has reached its left hand position, it is indicated that the end of the line has been reached, whereupon button 128 may be depressed to operate the tracker 63 which, as has already been explained, releases the lifter tracker 23 and allows the same to move toward the left and also allows the arms 22 to move in the same direction and the arm 19 to descend, thereby allowing the rods 9 to rotate and such of the display members 10 as are not held up as in the previous instance to be rotated to display the legends on the entire line of character units. After the legend has been displayed for a sufficient length of time, the carriage may be drawn to the right and the operation repeated. It is to be noted that in changing from the consecutive or first prescribed method of operating the display members 10 of the character units A to the simultaneous or last described method of doing so it is advisable to press the button 128 before operating the lever 122 to insure that a double stroke of the tracker 23 has been made to have the disk 32ª placed in position to commence the line.

The teeth on the reverse side of the combs 26 are the complement of those on the upper side, that is to say they would hold up the tumblers that the upper teeth allow to descend, and allow to descend those of the tumblers which the upper teeth hold up. Therefore by reversing the combs the characters formed are of the color of the previous background and the back ground is the color of the previous characters. By pressing down upon the part 110, which projects through the case of the apparatus J, and simultaneously depressing one or more keys the character units may be operated as rapidly as the rocker 47 oscillates. For instance, by pressing down the keys "H" and "I" the whole line of units A may have the convex sides of all the display members 10 turned to be on display in rapid succession.

While one form of construction in which the invention may be embodied has been particularly illustrated and described, many changes and modifications thereof will readily occur to those skilled in the art wherefore the right is reserved to all such changes and modifications as do not depart from the spirit and scope of the invention as defined in the appended claims.

I claim:

1. In mutable publicity apparatus, a character unit comprising a frame, rods pivotally mounted on the side pieces of said frame and each provided with projections thereon, and display members pivotally mounted on said rods, said display members each including a curved piece having the sides thereof of different appearance and disposed to be engaged by said projections when the rods are turned.

2. In mutable publicity apparatus, the combination of a character unit comprising a frame, rods pivotally mounted on the side pieces of said frame and each provided with projections thereon, and display members pivotally mounted on said rods, said display members having the sides thereof of different appearance and disposed to be engaged by said projections when the rods are turned, and means for turning said rods.

3. In mutable publicity apparatus, in combination, a character unit comprising a frame, rods pivotally mounted on the side pieces of said frame and each provided with projections thereon, and display members pivotally mounted on said rods, means for turning said rods in common to set the display members in like position, and means operable to change the position of a part of the display members to form a desired character.

4. In mutable publicity apparatus, in combination, a character unit comprising a frame, rods pivotally mounted on the side pieces of said frame and each provided with projections thereon, and display members pivotally mounted on said rods, said display members having the sides thereof of different appearance and disposed to be engaged by said projections when the rods are turned, a side plate connected with said rods, a shaft operatively connected with said side plate, and means operatively connected with said shaft to rotate the same.

5. In mutable publicity apparatus, in combination, a character unit comprising a frame, rods pivotally mounted on the side pieces of said frame and each provided with projections thereon, and display members pivotally mounted on said rods, said display members having the sides thereof of different appearance and disposed to be engaged by said projections, and means for turning said rods, said means including a side plate connected with said rods, a shaft operatively connected with said side plate, a tracker operatively connected with said shaft, and operating means connected with said tracker.

6. In mutable publicity apparatus, in combination, a character unit provided with movable display members thereon, said display members having the sides thereof of different appearance, means for setting the display members in common in like position, selective mechanism adapted to be operatively connected with said display members to change the position of a part of the display members to form a desired character, operating mechanism to actuate the selective mechanism, and transmitting mechanism to control the action of said operating mechanism.

7. In mutable publicity apparatus, in combination, a character unit having movable display members thereon, said display members having the sides thereof of different appearance, means for turning said display members in common to set the same in like position, means to change the position of a part of the display members to form a desired character, said means including a toothed comb, a tracker adapted to engage said comb, and means operating said tracker, said means including a hook connected with said tracker and a rocker adapted to engage with said hook.

8. In publicity apparatus, in combination, a character unit provided with movable display members thereon, said display members having the sides thereof of different appearance, means for turning said display members in common to set the same in like position, and means to change the position of a part of said display members to form a desired character, said means including a toothed comb adapted to be operatively connected with said display members, a tracker to engage said comb, a guide for moving said tracker into engagement with said comb, means to operate said guide, and means to operate said tracker.

9. In mutable publicity apparatus, in combination, a character unit provided with movable display members thereon, said display members having the sides thereof of different appearance, means for turning said display members in common to set the same in like position, and means operable to change the position of a part of the display members to form a desired character, said means including a toothed comb and a tracker adapted to engage said comb, engaging mechanism operatively connected with the tracker, operating mechanism connected with said tracker, and means for returning said tracker to a predetermined position.

10. In mutable publicity apparatus, the combination of a character unit comprising a frame, rods pivotally mounted on the side pieces of said frame and each provided with projections thereon, and display members pivotally mounted on said rods, said display members having the sides thereof of different appearance and disposed to be engaged by said projections when the rods are turned, means for turning said rods, including a side plate connected with said rods, a shaft operatively connected with said side plate, and means for turning said shaft, and means for holding said shaft from turning to thereby hold said side piece in its upper position.

11. In mutable publicity apparatus, in combination, a character unit having display members movably mounted thereon, said display members having the sides thereof of different appearance, means for turning said display members in common to set the same in like position, said means including a side plate operatively connected with said display members, and a shaft operatively connected with said side plate, means to rotate said shaft, and means for holding said shaft from rotation.

12. In mutable publicity apparatus, in combination, a series of stationary character units each provided with display members movably mounted thereon, said display members having the sides thereof of different appearance, means operatively connected with each of said units to set the display members thereon in like position, said means including a side plate and a shaft for moving said side plate, and trip means for holding said shaft from rotation when said display members have been set in like position.

13. In mutable publicity apparatus, in combination, a series of stationary character units having display members movably mounted thereon, re-setting means associated with the character units, said means including a shaft whereby said display members may be turned to assume a like position, and trip means operatively connected with said re-setting means for holding said shaft from rotation.

14. In mutable publicity apparatus, in combination, a series of stationary character units having movable display members thereon, said display members having the sides thereof of different appearance, mechanism including a shaft operatively connected with each of said units for setting the display members thereon in like position, selective mechanism operatively connected with the display members of each of said units, trip means for holding said shaft from rotation, operating mechanism to actuate said selective mechanism, and mechanism for controlling engagement of the operating mechanism with the selective mechanism.

15. In mutable publicity apparatus, in combination, a series of stationary character units having movable display members thereon, said display members having the sides thereof of different appearance, means operatively connected with each of said units for turning the display members in common to assume a like position, selective mechanism associated with the display members of each of the character units, engaging mechanism associated with said selective mechanism, operating mechanism adapted to be connected with said selective mechanism by action of the engaging mechanism, and mechanism adapted to be operatively connected with said units successively to actuate the engaging mechanism.

16. In mutable publicity apparatus, in combination, a series of stationary character units having display members movably mounted thereon, means operatively connected with the display members of each of said units for setting the same in a like position, selective mechanism associated with said display members, operating mechanism to actuate said selective mechanism, engaging mechanism to control operative connection of said selective mechanism with said operating mechanism, and automatic mechanism to actuate the said engaging mechanism of the units in succession.

17. In mutable publicity apparatus, in combination, a series of stationary character units having the sides thereof of different appearance, means including a shaft operatively connected with the display members of each of said units for setting said display members in like position, selective mechanism associated with the display members of each of said units, operating mechanism to actuate said selective mechanism, engaging mechanism to connect the operating mechanism with the selective mechanism, mechanism operatively connected to actuate said engaging mechanism of the units in succession, and trip means for holding said shaft from rotation.

18. In mutable publicity apparatus, in combination, a series of stationary character units each having display members movably mounted thereon, said display members having the sides thereof of different appearance, means including a shaft operatively connected with said display members of each of said units for setting the display members in like position, selective mechanism associated with the display members of each of said units, key-controlled mechanism to operate said selective mechanism, and engaging mechanism to effect operative relation between the key-controlled and selective mechanisms.

19. In mutable publicity apparatus, in combination, a series of character units, each having display members movably mounted thereon, said display members having the sides thereof of different appearance, means including a shaft operatively connected with the display members of each of said units to set the display members in like position, selective mechanism associated with said display members of each of the units, operating mechanism to actuate said selective mechanism, engaging mechanism to effect operative relation between the operating and selective mechanisms, and transmitting apparatus to control said operating mechanism.

20. In mutable publicity apparatus, in combination, a series of stationary character units having movable display members thereon, said display members having the sides thereof of different appearance, means including a shaft adapted to be operatively connected with the display members of each of said units to set the display members in like position, selective mechanism associated with the display members of each of said units, operating mechanism to actuate said selective mechanism, engaging mechanism to effect operative relation between the operating and selective mechanisms, mechanism adapted to be operatively connected with the units successively to actuate said engaging mechanism, and trip means for holding said shaft from rotation.

21. In mutable publicity apparatus, in combination, a series of stationary character units having movable display members thereon, said display members having the sides thereof of different appearance, means including a shaft adapted to be operatively connected with the display members of each of said units to set the same in a like position, selective mechanism associated with said display members of each of the character units, operating mechanism to actuate the selective mechanism, engaging mechanism to effect operative relation between the operating and selective mechanisms, transmitting apparatus to control the action of said operating mechanism, and means for preventing unintentional repetition of actuation of said selective mechanism by said operating mechanism.

22. In mutable publicity apparatus, in combination, a series of stationary character units having display members movably mounted thereon, said display members having the sides thereof of different appearance, means including a shaft adapted to be operatively connected with the display members of each of said units to set the same in a like position, selective mechanism associated with the display members of each of the units, operating mechanism to actuate the selective mechanism, engaging mechanism to effect operative relation between the operating and selective mechanism, mechanism adapted to be operatively connected with the units successively to actuate the engaging mechanism, transmitting apparatus to control said operating mechanism, and trip means for holding said shaft from rotation.

23. In mutable publicity apparatus, in combination, a series of stationary character units having movable display members thereon, said display members having the sides thereof of different appearance, means including a shaft operatively connected with the display members of each of said units for setting the display members in like position, selective mechanism associated with said display members of each of the units, operating mechanism to actuate the selective mechanism, engaging mechanism to effect operative relation between the operating and selective mechanisms, mechanism adapted to be operatively connected with said units successively to actuate the engaging mechanism, trip means for holding said shaft from rotation, and means for preventing the unintentional repetition of actuation of said selective mechanism by said operating mechanism.

24. In mutable publicity apparatus, in combination, a series of stationary character units having movable display members thereon, said display members having the sides thereof of different appearance, means including a shaft adapted to be operatively connected with the display members of each of said units for setting the display members in a like position, selective mechanism associated with the display members of each of said units, said selective mechanism including toothed combs and trackers adapted to be engaged with said combs, a tracker guide associated with the trackers of each of said units, a cam disk operatively associated with each tracker guide, a spacer tracker operatively connected with the cam disks, means to operate said spacer tracker, and operating mechanism to actuate the comb trackers.

25. In mutable publicity apparatus, in combination, a series of stationary character units having movable display members thereon, said display members having the sides thereof of different appearance, means including a shaft adapted to be operatively connected with the display members of each of said units for setting the display members in a like position, selective mechanism associated with said display members of each of the units, said selective mechanism including toothed combs and trackers movable into engagement with said combs, means including a cam disk for moving said trackers into engagement with the combs, and key-controlled operating mechanism to actuate said trackers.

26. The combination with a movable part, of a tracker movable to engage with said part, a rocker, a hook pivotally connected with said tracker and adapted to be engaged by a part carried by said rocker, means on said rocker for raising said hook, means for holding said hook out of the path of movement of said part on the rocker, and means to control the action of the last mentioned means.

27. The combination with a part to be moved, of a tracker movable into engagement with said part, a rocker, a hook pivotally connected with said tracker and adapted to be engaged by a part on said rocker, means on said rocker for raising said hook, means for holding said hook in said raised position out of the path of movement of the part on said rocker, means controlling the action of the last mentioned means, and means including a tracker connected with said rocker for returning the first tracker to its original position after it has been moved by the part on the rocker.

28. In mutable publicity apparatus, in combination, a plurality of stationary character units having display members movably mounted thereon, means connected with each of said units for turning the display members thereon to set the same in like position, and means operable to change the position of a part of the display members on the character units in succession to form a desired legend, the last means including toothed combs and trackers adapted to engage said combs, hooks pivotally connected with said trackers, a rocker provided with means for raising said hooks and with means adapted to engage with said hooks to move the same, means to hold said hooks in raised position, means to control the action of the last mentioned means, and means including a tracker operatively connected with said rocker for returning the first trackers to a predetermined position.

29. In mutable publicity apparatus, in combination, a plurality of stationary character units having display members movably mounted thereon, means connected with each of said units for turning the display members thereon to set the same in like position, means operable to change the position of a part of the display members on the character units to form a desired legend, means including keys for controlling the action of the last mentioned means, and means preventing the depression of any of said keys while another of said keys is in depressed position.

30. In mutable publicity apparatus, in combination, a series of stationary character units having display members movably mounted thereon, said display members having the sides thereof of different appearance, means connected with each of said units for moving the display members thereon to set the same in a like position; said means including a shaft operatively connected with the display members, means including a tracker to operate said shaft, selective mechanism associated with each of said character units, and means for operating the selective mechanism to display a desired character on said character units in succession.

31. In mutable publicity apparatus, in combination, a series of stationary character units having movable display members thereon, said display members having the sides thereof of different appearance, means operatively connected with each of said units for moving the display members in common to assume a like position, selective mechanism associated with the display members of each of said units, operating mechanism to actuate the selective mechanism, engaging mechanism to effect operative relation between the operating mechanism and the selective mechanism, and automatic means to operate the engaging mechanism of succeeding character units.

32. In mutable publicity apparatus, in combination, a series of stationary character units having movable display members thereon, said display members having the sides thereof of different appearance, means operatively connected with each of said units for moving the display members in common to assume a like position, selective mechanism associated with the display members of each of said units, operating mechanism to actuate the selective mechanism, engaging mechanism to effect operative relation between the operating mechanism and the selective mechanism, and automatic means to operate the engaging mechanism of succeeding character units, the last means including pivotally mounted cam disks provided with a pivot near the periphery thereof and each having a part pivotally mounted near the periphery thereof, said part having thereon a pin and a pivot, said pin and pivot and the pivot of the part arranged so that straight lines joining them together form a substantially equilateral triangle, a link having one end thereof connected to the pivot on the part of one of the disks and having the other end thereof mounted on the pivot near the periphery of a preceding disk, the last pivot being at a greater radial distance than the pivot on said part, a spring attached to said link, and a tracker adapted to be engaged by the pin on said part.

33. The combination of pivotally mounted disks each provided with a pivot disposed near the periphery thereof and each having a part pivotally mounted near the periphery thereof, said part having thereon a pin and a pivot which pin and pivot and the pivot of the part are arranged so that straight lines joining them together form a substantially equilateral triangle, a link having one end thereof connected to the pivot on the part of one of the disks and the other end thereof mounted on the pivot disposed near the periphery of the next disk, the last pivot being at a greater radial distance than the pivot on the part, a spring connected with said link, a tracker adapted to engage with the pin on said part, and means to operate the tracker.

34. The combination of a character unit having display members movably mounted thereon, means for moving said display members to set the same in like position, said means including a shaft operatively connected with said display members and means to turn the shaft, and trip means for holding said shaft from turning, the last means including a pivot, a part and a trip member coaxially mounted on said pivot, a latch on said part adapted to engage with said trip member, a bar carried by said trip member for the purpose set forth, an arm mounted on said shaft and having a projection adapted to engage said latch, and a spring for holding the trip member in engagement with said arm.

35. In mutable publicity apparatus, the combination of trackers, and mechanism for operating said trackers, said mechanism including a rocker having a bar thereon, hooks pivotally connected with said trackers and adapted when in a down position to be moved by said bar, and means for holding any of said hooks in an up position.

36. In mutable publicity apparatus, the combination of trackers, and mechanism for operating said trackers, said mechanism including a rocker having a bar thereon, hooks pivotally connected with said trackers and adapted when in a down position to be moved by said bar, latches for holding said hooks in an up position, and means for operating said latches.

37. In mutable publicity apparatus, the combination of trackers, and mechanism for operating said trackers, said mechanism including a rocker having a bar thereon, hooks pivotally connected with said trackers and adapted when in a down position to be moved by said bar, and key controlled means for holding any of said hooks in an up position.

38. In mutable publicity apparatus, the combination of trackers, and mechanism for operating said trackers, said mechanism including a rocker having a bar thereon, hooks pivotally connected with said trackers and adapted when in a down position to be moved by said bar, and electromagnets for holding the hooks in an up position.

39. In mutable publicity apparatus, the combination of a lifter tracker having a projection thereon, a pivoted stop adapted to engage with said projection, a short tracker provided with a slot and having an inclined portion adapted to raise the stop out of engagement with the projection, a stud on the lifting tracker arranged in the slot in the short tracker, and means to operate the trackers.

In testimony whereof, I have signed my name to this specification in the presence of two subscribing witnesses at Los Angeles, county of Los Angeles, State of California, this 21st day of August A. D. 1911.

F. CLARENCE NEWELL, Jr.

Witnesses:
S. C. SAULT,
ALEX. H. LIDDERS.